S. O. WHITE.
CLUTCH RELEASE.
APPLICATION FILED JULY 18, 1921.
1,431,552.
Patented Oct. 10, 1922.
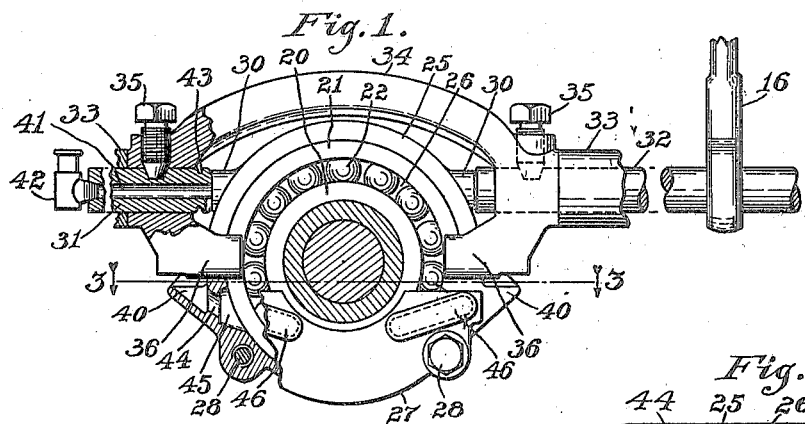
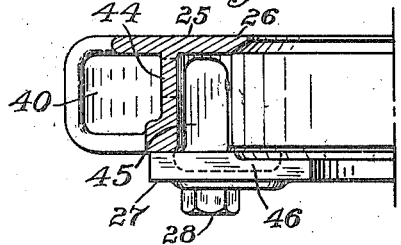
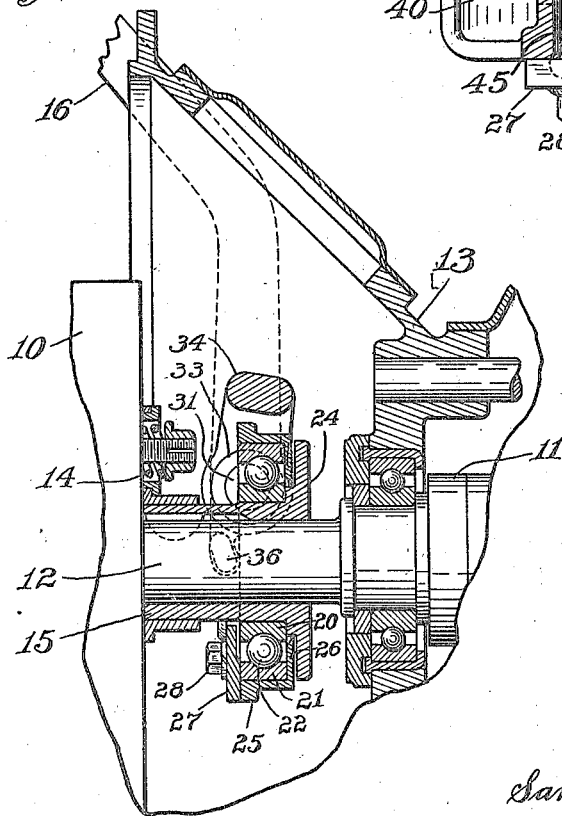
Inventor
Samuel O. White,
By Hood & Schley
Attorneys Patented Oct. 10, 1922.

1,431,552

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

CLUTCH RELEASE.

Application filed July 18, 1921. Serial No. 485,448.

*To all whom it may concern:*

Be it known that I, SAMUEL O. WHITE, a citizen of the United States, residing at Muncie, in the county of Delaware and State of Indiana, have invented a new and useful Clutch Release, of which the following is a specification.

It is the object of my invention to provide a clutch release having an annular ball bearing which is capable of taking the thrust of the clutch release, is self centering, has one member held against turning for avoiding friction between it and the clutch-release yoke and for maintaining proper lubrication, has an effective lubricating arrangement which requires substantially no attention, and does not cause vibration of the clutch pedal.

The accompanying drawing illustrates my invention: Fig. 1 is a front elevation, in partial section, of a clutch-release mechanism constructed in accordance with my invention; Fig. 2 is a vertical central section through such clutch-release mechanism, and parts of the neighboring transmission and clutch; and Fig. 3 is a fragmentary section on the line 3—3 of Fig. 1.

While my device is applicable to any style of transmission or clutch, I have shown it as one in which the transmission is mounted forward in the automobile and in the same unit with the clutch. The clutch 10 is connected to the main gear of the transmission 11 by the usual shaft 12, all being shown as within a suitable housing 13. The clutch, which may be of any desired construction, is spring-pressed to set position, by the usual springs 14, and may be released by sliding axially rearward the clutch-releasing sleeve 15. This axial rearward sliding of the sleeve 15 is obtained, as usual, by a clutch pedal 16. All this is common practice, and my invention resides in the mounting and arrangement of parts by which the clutch pedal 16 acts on the sleeve 15.

Concentric with the sleeve 15 is an annular ball bearing through which such pedal actuates the sleeve. This ball bearing comprises an inner ball-race 20 and an outer ball-race 21 provided on their adjacent (respectively outer and inner) faces with deep grooves in which the balls 22 of the ball bearing run. It is being found that this type of deep-groove ball bearings is well adapted to taking considerable end thrust, in addition to being able to carry radial load and to being self-centering so that its parts run true. The inner race 20 is tight on the sleeve 15 and at its rear end bears against an axially facing shoulder on an outwardly projecting flange 24 on the rear end of such sleeve. The outer race 21 fits tight within an annular carrier 25 which at its rear end preferably has an inwardly projecting flange 26 along the rear face of the race 21 and past the space between the two races. A segmental plate 27 is fastened by screws 28 to the forward edge of the carrier 25 to cover approximately the lower third thereof, such plate 27 and the flange 26 thus forming side walls of an oil-reservoir in which an oil level is maintained up to about the middle of the lowermost ball 22 or higher. The carrier 25, with the outer ball-race 21 and the segmental plate 27, is non-rotatable, but it and its carried parts are movable axially of shaft 12.

To provide for this, the carrier 25 at its upper part has two laterally facing bosses or abutments 30 in the plane of the carrier, which bosses have vertical plane surfaces for abutting against the correspondingly vertical end surfaces of two alined shafts 31 and 32, which are mounted in suitable bearings 33 above and transverse to the shaft 12 and between the ends of which the upper part of the carrier 25 lies. The shaft 32 has fixed thereon the clutch pedal 16, so that by the operation of such pedal the shaft 32 is turned through a small angle. A yoke 34 overlies the carrier 25 and is mounted on the adjacent ends of the shafts 31 and 32, being clamped at least to the shaft 32, and as shown being clamped to both shafts, in any suitable manner, as by clamping screws 35. The yoke 34 has a pair of downwardly and inwardly projecting fingers 36, which lie in front of the annular carrier 25 at its two sides substantially in the horizontal plane of the shaft 12. These fingers project over the forward edge of the carrier 25 and the forward edge of the ball-race 21, and act upon both such carrier and such ball-race, or upon either one alone.

In consequence, by depressing the clutch pedal 16 the shaft 32 and yoke 34 are turned in a counter clockwise direction as seen in Fig. 2, and the fingers 36 push the carrier 25 and the outer ball-race 21 rearward in a rectilinear line, the bosses 30 sliding on the end faces of the shafts 31 and 32 in such rectilinear movement, but without interfering with such movement or with the centering of all the parts of the ball bearing on the sleeve 15; and as the carrier 25 and the outer ball-race 21 move to the rear such ball-race acts through the balls 22 upon the inner ball-race 20 to force it and the sleeve 15 rearward to release the clutch. When the clutch pedal is released, the springs 14 move the parts back to normal. The outer ball-race 21 is held from rotation by being clamped in place in the carrier 25 by the segmental plate 27, and the carrier 25 is prevented from rotation by the action of the bosses 30 and the ends of the shafts 31 and 32. By thus holding the parts 21 and 25 from rotation a better bearing action is obtained, and friction between the front edges of the parts 21 and 25 and the yoke fingers 36 is avoided. The rectilinear movement of the parts 21 and 25 described above is obtained without any support for such parts other than that provided by the mounting of the bearing as a whole on the sleeve 15, which has a rectilinear movement on the shaft 12 by reason of its sliding mounting thereon.

In order to lubricate this bearing, the carrier 25 has a laterally projecting upwardly opening oil cup 40 which lies beneath the joint between the end of the shaft 31 and the abutting face of a boss 30. As shown, the carrier has two such oil cups 40, one on each side, to make the same carrier suitable for cars with either right-hand or left-hand drive. The shaft 31 is provided with an axial hole 41 through it, and there is mounted in the outer end of this hole an oil cup 42, which supplies oil to the hole 41 so that such oil lubricates the abutting faces of the shaft 31 and boss 30 and drips from the inner end of the shaft 31 into the oil cup 40. In order to control the point of dripping, the shaft 31 is provided near its inner end with a circumferential groove 43, which prevents the oil from feeding back along the outside surface of said shaft. The oil which drips off the inner end of the shaft 41 is caught by the cup 40 and fed therefrom through an opening 44 into an oil space 45 lying just outside the outer ball-race 21, and from this oil space the oil passes by a groove 46 provided in the inner face of the segmental plate 27 to the ball space and oil pocket between the inner and outer ball-races 20 and 21, in which space the oil rises to the level of the top of the plate 27 or of the flange 26, which are at least as high as the middle of the lowermost ball. Thus as the balls move they pass through this pool of oil, and effective lubrication is maintained.

I claim as my invention:

1. In a clutch-release mechanism, the combination of a clutch-actuating sleeve, an annular thrust-taking ball bearing having inner and outer grooved ball-races and interposed balls in such grooves, the inner ball-race being carried by and rotatable with said sleeve, a carrier mounted upon and carried by said outer ball-race, a stationary abutment, an abutment on said carrier for engaging said stationary abutment to prevent rotation of said carrier and outer ball-race while permitting them to move axially and to be carried freely by said sleeve through the medium of the balls and inner ball-race, and a yoke for acting axially on said outer ball-race, to move the ball bearing and sleeve axially, said carrier being provided in its lower part with an oil pocket the sides of which are sufficiently high so that the balls of the ball bearing pass through the oil in such pocket, means for supplying oil to the engaging faces of said abutments, and a cup on said carrier for catching oil which drips from said abutment faces feeding such oil to such oil pocket.

2. In a clutch-release mechanism, the combination of a clutch-actuating sleeve, an annular thrust-taking ball bearing having inner and outer grooved ball-races and interposed balls in such grooves, the inner ball-race being carried by and rotatable with said sleeve, a carrier mounted upon and carried by said outer ball-race, two alined shafts transverse to the axis of said sleeve and having a gap between them into which said carrier extends, a yoke carried by said shafts and having fingers for acting axially on said outer ball-race, means for turning one of said shafts and said yoke to move said outer ball-race and therethrough to move the inner ball-race and the sleeve, and an abutment on said carrier for engaging the end of one of said shafts to prevent rotation of the carrier.

3. In a clutch-release mechanism, the combination of a clutch-actuating sleeve, an annular thrust-taking ball bearing having inner and outer grooved ball-races and interposed balls in such grooves, the inner ball-race being carried by and rotatable with said sleeve, a carrier mounted upon and carried by said outer ball-race, two alined shafts transverse to the axis of said sleeve and having a gap between them into which said carrier extends, a yoke carried by said shafts and having fingers for acting axially on said outer ball-race, means for turning one of said shafts and said yoke to move said outer ball-race and therethrough to move the inner ball-race and the sleeve, and an abutment on said carrier for engaging the end of one of said shafts to prevent rotation of the carrier, means for supplying oil through the shaft to the engaging faces of said abutment and shaft, and means for catching the oil which drips from said engaging faces and feeding it to said ball bearing.

4. In a clutch-release mechanism, the combination of a clutch-actuating sleeve, an annular thrust-taking ball bearing having inner and outer grooved ball-races and interposed balls in such grooves, the inner ball-race being carried by and rotatable with said sleeve, a carrier mounted upon and carried by said outer ball-race, two alined shafts transverse to the axis of said sleeve and having a gap between them into which said carrier extends, a yoke carried by said shafts and having fingers for acting axially on said outer ball-race, means for turning one of said shafts and said yoke to move said outer ball-race and therethrough to move the inner ball-race and the sleeve, and abutments on said carrier for engaging the adjacent ends of said shafts to prevent rotation of the carrier.

5. In a clutch-release mechanism, the combination of a clutch-actuating sleeve, an annular thrust-taking ball bearing having inner and outer grooved ball-races and interposed balls in such grooves, the inner ball-race being carried by and rotatable with said sleeve, a carrier mounted upon and carried by said outer ball-race, two alined shafts transverse to the axis of said sleeve and having a gap between them into which said carrier extends, a yoke carried by said shafts and having fingers for acting axially on said outer ball-race, means for turning one of said shafts and said yoke to move said outer ball-race and therethrough to move the inner ball-race and the sleeve, and an abutment on said carrier for engaging the end of one of said shafts to prevent rotation of the carrier, means for supplying oil to the engaging faces of said abutment and shaft, and means for catching the oil which drips from said engaging faces and feeding it to said ball bearing.

In witness whereof, I, SAMUEL O. WHITE, have hereunto set my hand at Muncie, Indiana, this fifteenth day of July, A. D. one thousand nine hundred and twenty-one.

SAMUEL O. WHITE.